(12) United States Patent
Kim et al.

(10) Patent No.: US 7,596,810 B2
(45) Date of Patent: Sep. 29, 2009

(54) APPARATUS AND METHOD OF DETECTING NETWORK ATTACK SITUATION

(75) Inventors: Jin Oh Kim, Daejeon (KR); Seon Gyoung Sohn, Daejeon (KR); Hyochan Bang, Daejeon (KR); Soo Hyung Lee, Daejeon (KR); Dongyoung Kim, Daejeon (KR); Beom Hwan Chang, Daejeon (KR); Geon Lyang Kim, Daejeon (KR); Hyun Joo Kim, Daejeon (KR); Jung Chan Na, Daejeon (KR); Jong Soo Jang, Daejeon (KR); Sung Won Sohn, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 762 days.

(21) Appl. No.: 11/081,682

(22) Filed: Mar. 17, 2005

(65) Prior Publication Data

US 2006/0119486 A1    Jun. 8, 2006

(30) Foreign Application Priority Data

Dec. 3, 2004    (KR)    ........................ 10-2004-0101086

(51) Int. Cl.
*G08B 23/00*    (2006.01)
*G06F 15/173*    (2006.01)
(52) U.S. Cl. ..................... 726/22; 726/25; 709/224
(58) Field of Classification Search .................. 726/22, 726/25
See application file for complete search history.

(56) References Cited

U.S. PATENT DOCUMENTS 5,819,028 A * 10/1998 Manghirmalani et al. ..... 714/57

(Continued)

FOREIGN PATENT DOCUMENTS

KR    1020030052512    6/2003

OTHER PUBLICATIONS

Hervé Debar, et al.; "Aggregation and Correlation of Intrusion-Detecting Alerts"; W. Lee, L. Mé, and A. Wespi (Eds.): RAID 2001, LNCS 2212, pp. 85-103, 2001.

*Primary Examiner*—Ponnoreay Pich
(74) *Attorney, Agent, or Firm*—Lowe Hauptman Ham & Berner, LLP

(57) ABSTRACT

Provided is an apparatus for detecting a network attack situation. The apparatus includes an alarm receiver receiving a plurality of alarms raised in a network to which the alarm receiver is connected, converting the alarms into predetermined alarm data, and outputting the alarm data; an alarm processor analyzing an attack situation in the network based on attributes of the alarm data and a number of times that the alarm data is generated; a memory storing basic data needed to analyze the state of the network and providing the basic data to the alarm processor; and an interface transmitting the result of the analysis by the alarm processor to an external device, receiving a predetermined critical value from the external device, which is a basis for determining the occurrence of the attack situation, and outputting the critical value to the alarm processor such that the alarm processor can store the critical value in the memory. Equal numbers of hash engines and detection engines for processing the alarms in the network to the number of data groups classified as network attack situations are formed in a line. Therefore, a network attack situation can be detected in real time based on a great number of alarms indicating intrusion detection.

4 Claims, 6 Drawing Sheets

U.S. PATENT DOCUMENTS

| | | | |
|---|---|---|---|
| 6,000,045 A * | 12/1999 | Lewis | 714/47 |
| 6,088,804 A * | 7/2000 | Hill et al. | 726/25 |
| 6,327,677 B1 * | 12/2001 | Garg et al. | 714/37 |
| 7,043,759 B2 * | 5/2006 | Kaashoek et al. | 726/25 |
| 7,143,442 B2 * | 11/2006 | Scarfe et al. | 726/23 |
| 2002/0107953 A1 * | 8/2002 | Ontiveros et al. | 709/224 |
| 2002/0129264 A1 * | 9/2002 | Rowland et al. | 713/200 |
| 2003/0069959 A1 * | 4/2003 | Tse | 709/224 |
| 2003/0196123 A1 * | 10/2003 | Rowland et al. | 713/201 |
| 2003/0221005 A1 * | 11/2003 | Betge-Brezetz et al. | 709/224 |
| 2006/0075489 A1 * | 4/2006 | Ganguly et al. | 726/22 |

* cited by examiner

FIG. 1

| Attack Situation (110) | Attack Type (120) | Source IP Address (130) | Target IP Address (140) | Service Type (150) | Description (160) |
|---|---|---|---|---|---|
| 1-1 | IDENTICAL | IDENTICAL | IDENTICAL | - | ATTACKER IS REPEATEDLY MAKING THE SAME ATTACK ON A TARGET |
| 1-2 | - | IDENTICAL | IDENTICAL | IDENTICAL | ATTACKER IS REPEATEDLY MAKING VARIOUS ATTACKS ON A PARTICULAR SERVICE OF A TARGET |
| 2-1 | - | IDENTICAL | IDENTICAL | - | ATTACKER IS REPEATEDLY MAKING MANY ATTACKS ON A TARGET |
| 2-2 | IDENTICAL | - | IDENTICAL | - | ATTACKER IS REPEATEDLY MAKING THE SAME ATTACK ON A TARGET |
| 2-3 | IDENTICAL | IDENTICAL | - | - | ATTACKER IS REPEATEDLY MAKING A PARTICULAR ATTACK |
| 2-4 | - | IDENTICAL | - | IDENTICAL | A PARTICULAR SERVICE OF UNSPECIFIED TARGET IS UNDER ATTACKS BY AN ATTACKER |
| 2-5 | - | - | IDENTICAL | IDENTICAL | A PARTICULAR SERVICE OF A TARGET IS UNDER VARIOUS ATTACKS FROM MANY ATTACKERS |
| 3-1 | - | IDENTICAL | - | - | ATTACKER IS CONTINUOUSLY MAKING VARIOUS ATTACKS |
| 3-2 | - | - | IDENTICAL | - | VARIOUS ATTACKERS ARE MAKING VARIOUS ATTACKING ON A TARGET |
| 3-3 | IDENTICAL | - | - | - | A PARTICULAR ATTACK IS CONTINUOUSLY BEING MADE IN NETWORK |

FIG. 6

```
N: A TOTAL OF SLOTS (WINDOW SIZE)
LTT: LAST TIME TICK
ATT: ARRIVED TIME TICK
SUM: A TOTAL OF COUNTERS GENERATED WITHIN VALID TIME
SLOT: COUNTER VALUE GENERATED IN EACH TIME SLOT
TS(LTT): LTT mod N
TS(ATT): ATT mod N Algorithm:
if ((ATT - LTT) >= N)
begin
    LTT := ATT;
    forall i (0 <= i < N)
    begin
        SLOT[i] := 0;
    end
    SLOT[TS(ATT)] := 1;
    SUM := 1;
end
else
begin
    if (ATT = LTT)
    begin
        SLOT[TS(ATT)] := SLOT[TS(ATT)] + 1;
        SUM := SUM + 1;
    end
    else
    begin
        forall i, (if TS(LTT) < TS(ATT) then TS(LTT) < i <= TS(ATT);
  otherwise, TS(LTT) < i < N and 0 <= i <= TS(ATT))
        begin
            SUM := SUM - SLOT[i];
            SLOT[i] := 0;
        end
        SLOT[TS(ATT)] := 1;
        SUM := SUM + 1;
    end
end.
```

APPARATUS AND METHOD OF DETECTING NETWORK ATTACK SITUATION

This application claims the priority of Korean Patent Application No. 10-2004-0101086, filed on Dec. 3, 2004, in the Korean Intellectual Property Office, the disclosure of which is incorporated herein in its entirety by reference.

BACKGROUND OF THE INVENTION

1. Field of the Invention

The present invention relates to a network security technology, and more particularly, to an apparatus and method of detecting a network attack situation in real time by processing alarms indicating intrusion detection with high efficiency.

2. Description of the Related Art

Network attack situation detection refers to analyzing interrelation among a plurality of alarms indicating intrusion detection, which are raised at a plurality of locations in a network, and presuming an attack situation based on the analysis. For example, if a plurality of alarms are raised about a host, it can be presumed that the host is being attacked. Since the network attack situation detection reflects a current network attack situation, real-time analysis is particularly important.

However, there are limitations on analyzing alarms in a network in real time through a conventional database inquiry. For example, when alarm "A" is raised, if the conventional database inquiry is made to determine the number of times that the same alarm has been repeatedly raised during a predetermined interval, the alarm "A" must be compared with a great number of other alarms. Also, if such comparisons are made for every alarm, the performance of an apparatus for detecting network attack situations will be severely undermined.

In particular, since network size is increasing and a tremendous number of alarms are being raised due to a high false-positive rate, it is required for the apparatus to process a large amount of data to analyze alarms indicating intrusion detection.

SUMMARY OF THE INVENTION

The present invention provides an apparatus and method of detecting network attack situations classified into ten groups in real time based on a great number of alarms indicating intrusion detection.

According to an aspect of the present invention, there is provided an apparatus for detecting a network attack situation including: an alarm receiver receiving a plurality of alarms raised in a network to which the alarm receiver is connected, converting the alarms into predetermined alarm data, and outputting the alarm data; an alarm processor analyzing an attack situation in the network based on attributes of the alarm data and a number of times that the alarm data is generated; a memory storing basic data needed to analyze the state of the network and providing the basic data to the alarm processor; and an interface transmitting the result of the analysis by the alarm processor to an external device, receiving a predetermined critical value from the external device, which is a basis for determining the occurrence of the attack situation, and outputting the critical value to the alarm processor such that the alarm processor can store the critical value in the memory.

According to another aspect of the present invention, there is provided a method of detecting a network attack situation including: collecting a plurality of alarms raised in a network; extracting attributes of the alarms and generating at least one first data characterized by a combination of the attributes; and determining an attack situation in the network based on whether a number of times that the first data is generated exceeds a predetermined critical value.

BRIEF DESCRIPTION OF THE DRAWINGS

The above and other features and advantages of the present invention will become more apparent by describing in detail exemplary embodiments thereof with reference to the attached drawings in which:

FIG. 1 is a table showing ten groups of network attack situations according to an embodiment of the present invention;

FIG. 6 illustrates a pseudocode showing a counting algorithm; and

DETAILED DESCRIPTION OF THE INVENTION

The present invention will now be described more fully with reference to the accompanying drawings, in which exemplary embodiments of the invention are shown. The invention may, however, be embodied in many different forms and should not be construed as being limited to the embodiments set forth therein; rather, these embodiments are provided so that this disclosure will be thorough and complete, and will fully convey the concept of the invention to those skilled in the art.

FIG. 1 is a table showing ten groups of network attack situations according to an embodiment of the present invention. Detecting a network attack situation based on an analysis of interrelation among alarms indicating intrusion detection involves measuring the number of times that alarms having identical attributes are raised during a predetermined interval and presuming an attack situation in a network. FIG. 1 illustrates ten groups of attack situations. In other words, there are ten groups of attack situations divided according to four attributes such as an attack type 120, an attacker IP address 130, a target IP address 140 and a service type 150, and each group of attack situations have identical attributes.

Such groups are yardsticks for measuring the number of times that attacks having identical attributes are staged on a network. For example, if an attacker repeatedly attempts to make the same attack on a host, such attempts will be detected as attack situation 1-1 as illustrated in FIG. 1. A description of each group of attack situations is made under description 160 of FIG. 1 and thus will be omitted from the Detailed Description of the Invention.

As described above, the occurrence of an attack situation can be determined by observing the occurrence of alarms having identical attributes. In other words, the occurrence of an attack situation can be determined by measuring the number of times that alarms having identical attributes have been raised. Whether an attack situation has occurred is determined based on attack information having identical attributes and measured during a predetermined interval. In other words, detecting an attack situation is to determine whether the number of alarms having identical attributes and measured during a predetermined interval exceeds a critical value. The predetermined interval indicates the length of time for limiting valid alarms indicating intrusion detection.

Figure 2:
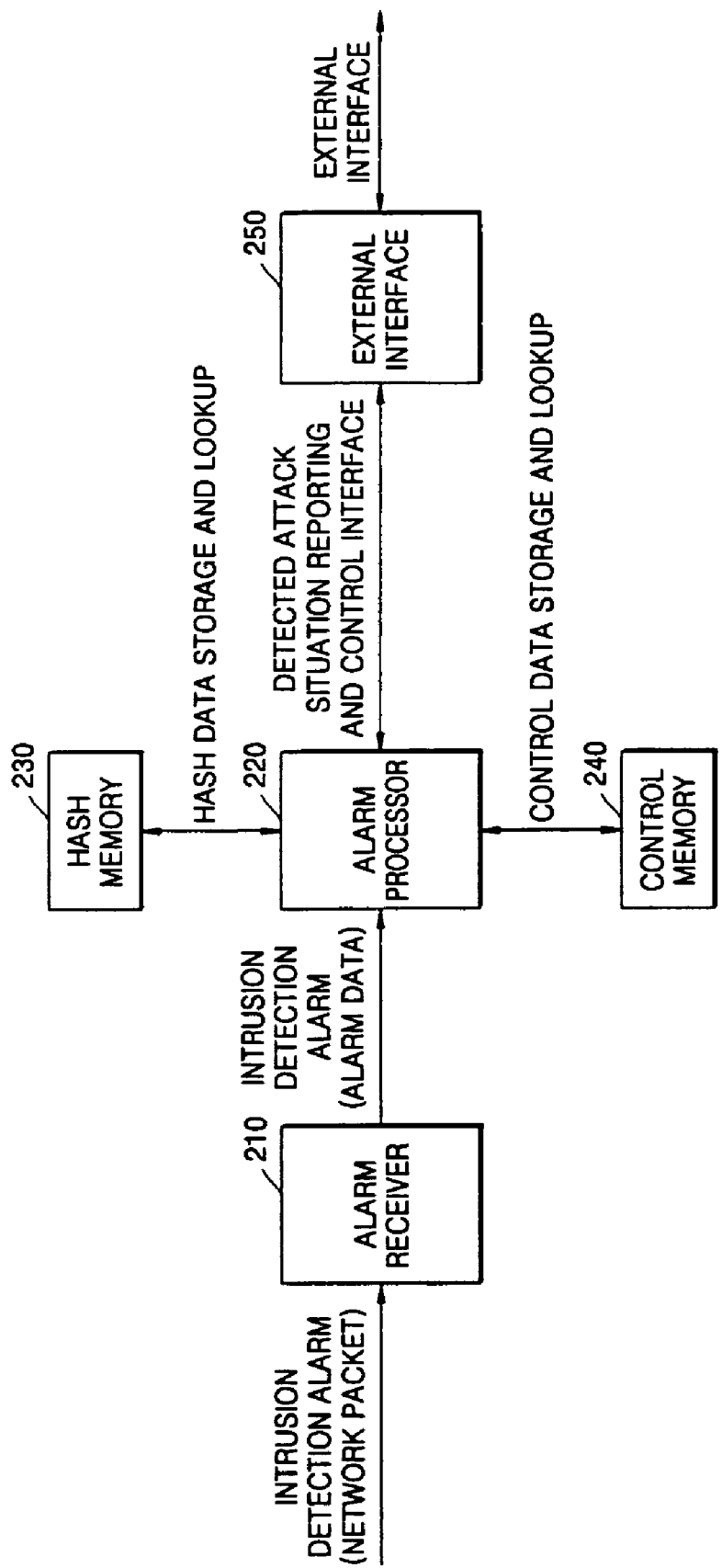
FIG. 2 is a block diagram of an apparatus for detecting a network attack situation according to an embodiment of the present invention.
Figure 7:
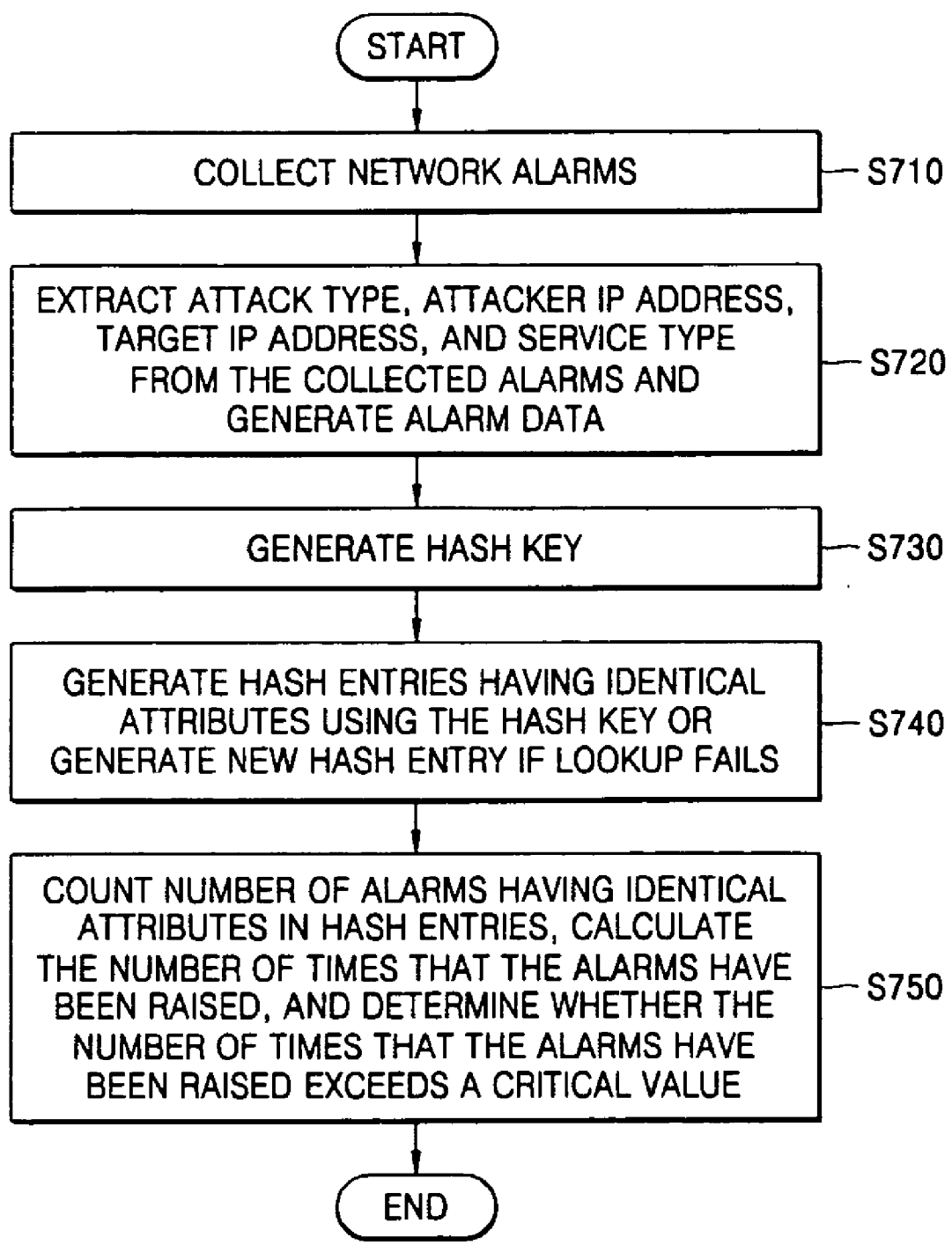
FIG. 7 is a flowchart illustrating a method of detecting a network attack situation according to an embodiment of the present invention.

FIG. 2 is a block diagram of an apparatus for detecting a network attack situation according to an embodiment of the present invention. FIG. 7 is a flowchart illustrating a method of detecting a network attack situation according to an embodiment of the present invention. Referring to FIG. 2, the apparatus includes an alarm receiver 210 receiving alarms from network to detect a network attack situation with high efficiency, an alarm processor 220 processing the alarms and detecting an attack situation, a hash memory 230 storing data needed for processing the alarms, a control memory 240 storing control data, and an external interface 250.

The alarm receiver 210 receives alarms from a network (S710), converts the alarm into alarm data, and transmits the alarm data to the alarm processor 220. The alarm processor 220 processes the alarm data and determines whether an attack situation has occurred using lookup and storing functions of hash entries stored in the hash memory 230. When the alarm processor 220 determines that an attack situation has occurred, it transmits the detected attack situation to the external interface 250.

The external interface 250 provides an interface function with the external apparatus needed to report the detected attack situation. The external interface 250 also provides an interface function for control from the external apparatus. Control information, such as critical values, received from the external apparatus transmitted to the alarm processor 240. Then, the alarm processor 240 transmits the control information to the control memory 240, which then stores the control information.

Figure 3:
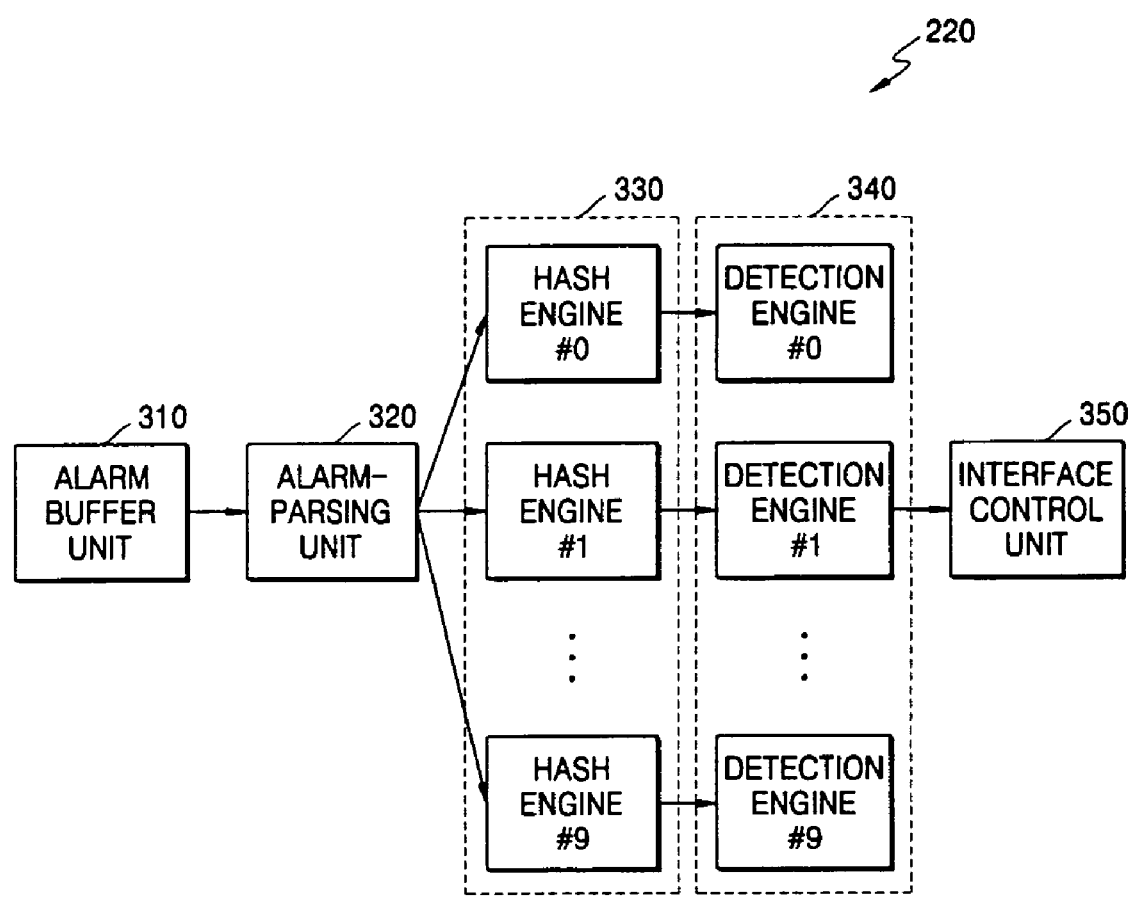
FIG. 3 is a detailed block diagram of an alarm processor illustrated in FIG. 2.

FIG. 3 is a detailed block diagram of the alarm processor 220 illustrated in FIG. 2. The alarm processor 220 includes an alarm buffer unit 310, an alarm-parsing unit 320, a hash engine unit 330, a detection engine unit 340, and an interface control unit 350.

The alarm buffer unit 310 receives alarm data from the alarm receiver 210. The alarm-parsing unit 320 receives alarms from the alarm buffer unit 310, extracts attributes of the alarms, creates data having the extracted attributes, and transmits the data to each of hash engines included in the hash engine unit 330. The hash engine unit 330 generates hash entries having identical attributes through a hash lookup. If the hash lookup fails, the hash engine unit 330 generates a new hash entry and transmits the new hash entry to the detection engine unit 340.

The detection engine unit 340 receives hash entries of alarm data having identical attributes from the hash engine unit 330, determines whether the number of alarms exceeds a critical value based on the hash entries, and detects an attack situation based on the determination. The interface control unit 350 provides an interface with the external interface 250.

The alarm-parsing unit 320 extracts four attributes such as an attack type, an attacker IP address, a target IP address, and a service type from alarm data received from the alarm buffer unit 310. The alarm-parsing unit 320 determines to which group of attack situations the alarm data belongs based on the attributes as defined in the table of FIG. 1 and transmits information regarding a determined group of attack situation to the hash engine unit 330 (S720).

The hash engine unit 330 generates a hash key using the determined group of attack situations received from the alarm-parsing unit 320 (S730) and determines whether the hash memory 230 includes hash entries having identical attributes. If hash entries having identical attributes are found, the hash engine unit 330 transmits the hash entries to the detection engine unit 330. If hash entries having identical attributes are not found, the hash engine unit 330 generates a new hash entry and transmits the new hash entry to the detection engine unit 330.

In the present embodiment, the alarm-parsing unit 320 generates ten groups of attack situations (see FIG. 1). To process the ten groups of attack situations with high efficiency, the hash engine unit 330 includes ten parallel engines, i.e., zeroth through ninth hash engines. In other words, the ten parallel engines included in the hash engine unit 330 process the ten groups of attack situations, respectively (S740).

Figure 4:
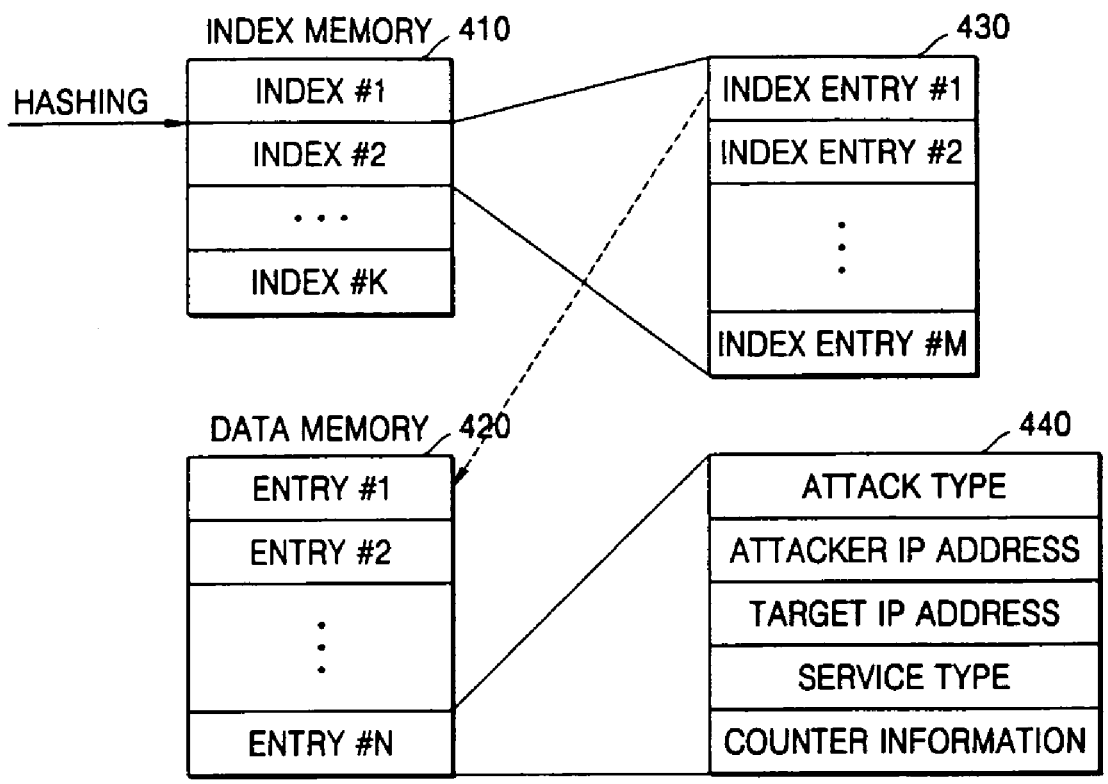
FIG. 4 illustrates a hash structure of a hash memory.

FIG. 4 illustrates a hash structure maintained in the hash memory 230 controlled by the hash engine unit 330. The hash memory 230 includes an index memory 410 and a data memory 420. The index memory 410 can be accessed using a hash key. Since the index memory 410 may have the same hash key even if index entries 430 have different attributes, the index entries 430 are maintained for respective indexes.

Each of the index entries 430 includes an effective bit indicating whether a corresponding index entry is effective and an address field indicating an address of a real data memory if the index entry is effective. Entries included in the data memory 420 are addressed by the index entries 430. Each of first through $N^{th}$ entries includes attribute information such as the attack pattern, the attacker IP address, the target IP address and the service pattern, and counter information managed by the detection engine unit 340.

The detection engine unit 340 counts the number of alarms having identical attributes in a hash entry received from the hash engine unit 330. The detection engine unit 340 also determines how many times the alarms have been raised within a valid time and whether the number of times that the alarms have been raised exceeds a critical value. If the number of times that the alarms have been raised exceeds the critical value, the detection engine unit 340 detects it as an attack situation and notifies information regarding the detection of the attack situation to the interface control unit 350.

Figure 5:
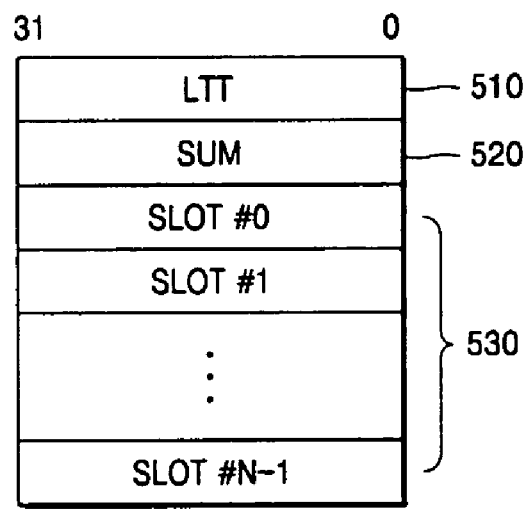
FIG. 5 illustrates the structure of a hash entry counter.

FIG. 5 illustrates an entry structure that the detection engine unit 330 manages using hash entries. Such entries are managed for respective identical attributes. In other words, each entry is managed for each identical attribute. Referring to FIG. 5, an LTT field 510 stores time information generated by an alarm that is raised last among alarms having identical attributes. $Zero^{th}$ through $(N-1)^{th}$ SLOTs 530 store counter information generated in each time slot and a SUM field 520 indicates the sum of all slot counters.

FIG. 6 illustrates an algorithm of counting alarms having identical attributes and determining whether the number of alarms exceeds a critical value using information of an entry structure as illustrated in FIG. 5. As described above, according to a mechanism of the present invention, such an analysis process is applied only to alarms occurred within a valid time. For the sake of high accuracy, a separate counter is prepared for each time unit and a slot counter is moved as time goes by.

Referring to the algorithm of FIG. 6, if the difference between an arrived time tick (ATT) and a last time tick (LTT) of last alarm data stored in a hash entry is greater than or equal to a window size (N), a value of the LTT is replaced with a value of the ATT and a value of SLOT is reset to zero. In addition, the value of the SLOT, i.e., the remainder obtained by dividing the ATT value by N, is stored as one and a value of SUM is also stored as one.

When the ATT and LTT values are equal, the count of the SLOT indexed by the LTT and the SUM are increased by one. If ATT-LTT is greater than zero and smaller than N, a sum of counter values respectively generated in a SLOT indexed by LTT+1 through a SLOT indexed by ATT−1 is subtracted from the SUM and the SLOT is reset to zero. The SLOT indexed by the ATT is stored as one and the value of the SUM is increased by one.

When the detection engine unit 340 completes counting the number of alarms in the entry, it determines whether an attack situation has occurred based on whether the value of the SUM exceeds a critical value. The critical value can be set through the external interface 250. Setting information transmitted to the external interface 250 is transmitted again to the interface control unit 350, which then stores the setting information in the control memory 240. Thus, data on a critical value used by the detection engine unit 340 is amended (S750).

The present invention can also be implemented as computer-readable code on a computer-readable recording medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, optical data storage devices, and carrier waves (such as data transmission through the Internet).

The computer-readable recording medium can also be distributed over network-coupled computer systems so that the computer-readable code is stored and executed in a distributed fashion.

A font-ROM data structure according to the present invention can also be implemented as computer-readable code on a computer-readable recording medium such as ROMs, RAMs, CD-ROMs, magnetic tapes, hard disks, floppy disks, flash memories, and optical data storage devices.

As described above, according to an apparatus and method of detecting a network attack situation, equal numbers of hash engines and detection engines for processing alarms in a network to the number of data groups classified as network attack situations are formed in a line. Therefore, a network attack situation can be detected in real time based on a great number of alarms indicating intrusion detection.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of detecting a network attack situation comprising:
   collecting a plurality of alarms raised in a network;
   extracting attributes of the alarms and generating at least one first data characterized by a combination of the attributes; and
   generating a hash key based on the at least one first data by hash engines, wherein the number of hash engines is equal to a number of first data;
   retrieving, by the hash engines, entries, having identical attributes, from a hash memory using a hash key lookup and the generated hash key;
   generating, by the hash engines, a new entry in the hash memory if no entries are retrieved; and
   determining, by detection engines, whether a predetermined critical value is exceeded based on the number of hash entries retrieved;
   wherein the number of the detection engines is equal to the number of the first data.

2. The method of claim 1, wherein the extracted attributes include an attack type, an attacker IP address, a target IP address, and a service type, and the at least one first data is characterized by the combination of the attributes generated.

3. The method of claim 1, wherein the generating of the hash key and the new entry comprises:
   forming an index memory accessed by the hash key and storing k (k is a positive integer) indexes having m (m is a positive integer) index entries; and
   forming a data memory addressed by the m index entries and storing n (n is a positive integer) entries containing predetermined attribute information and counter information.

4. The method of claim 1, wherein the determining whether the predetermined critical value is exceeded includes:
   counting the number of alarms having identical attributes based on the retrieved entries from a hash table and a number of times that the alarms have been raised within a valid time is calculated, and
   determining whether the number of alarms exceeds the predetermined critical value.

* * * * *